UNITED STATES PATENT OFFICE.

PATRICK MAGUIRE, OF NEW BOSTON, MASSACHUSETTS.

IMPROVED COMPOSITION FOR FINISHING WAX-LEATHER.

Specification forming part of Letters Patent No. 102,565, dated May 3, 1870.

*To all whom it may concern:*

Be it known that I, PATRICK MAGUIRE, of New Boston, in the county of Berkshire and State of Massachusetts, have invented a new and useful Compound for Finishing Wax-Leather; and I do hereby declare that the following is a full and exact description of the same.

This invention consists of a compound which is employed for finishing wax-leather, the ingredients of which are as follows: four quarts of the best flour, one-half pint of linseed-oil, one-half pint of fish-oil, one-fourth ounce of rosin, three ounces of tallow, one gill of sad-oil, one ounce of barberry-tallow, fourteen ounces of hard soap, and twenty-four quarts of water. Mix the same thoroughly and apply to the leather in any suitable manner.

Having thus fully described my invention, what I claim, and desire to secure by Letters Patent, is—

A compound composed of the foregoing ingredients.

This specification signed and witnessed this 3d day of March, 1870.

PATRICK MAGUIRE.

Witnesses:
    SAMUEL C. PARSONS,
    CATHARINE T. PARSONS.